United States Patent [19]

Damoci et al.

[11] Patent Number: 4,958,371
[45] Date of Patent: Sep. 18, 1990

[54] METHOD AND APPARATUS FOR DETERMINING WHEN A TELEPHONE HANDSET IS OFF-HOOK

[75] Inventors: Joseph A. Damoci, Beltsville; Matthew F. Kern, Catonsville, both of Md.; Russell J. Welsh; John D. Fourdraine, both of Toronto, Canada

[73] Assignee: Control Data Corporation, Minneapolis, Minn.

[21] Appl. No.: 183,065

[22] Filed: Apr. 19, 1988

[51] Int. Cl.⁵ .............................................. H04M 11/00
[52] U.S. Cl. ..................................... 379/377; 379/107; 379/385
[58] Field of Search ................. 379/106, 107, 98, 377, 379/96, 97, 385

[56] References Cited

U.S. PATENT DOCUMENTS

| | | | |
|---|---|---|---|
| 3,564,143 | 2/1971 | Stewart, Jr. | 379/107 |
| 3,588,357 | 6/1971 | Sellari | 379/107 |
| 4,002,837 | 1/1977 | Ebner et al. | 379/98 |
| 4,059,727 | 11/1977 | Kingswell et al. | 379/107 |
| 4,104,486 | 8/1978 | Martin et al. | 379/106 |
| 4,132,864 | 1/1979 | Feng | 379/377 |
| 4,306,116 | 12/1981 | McClure et al. | 379/98 |
| 4,310,724 | 1/1982 | Gonzalez | 379/378 |
| 4,321,429 | 3/1982 | Takatsuki et al. | 379/98 |
| 4,337,378 | 6/1982 | Davis | 379/385 |
| 4,392,023 | 7/1983 | Sears | 379/98 |
| 4,394,540 | 7/1983 | Willis et al. | 379/107 |
| 4,429,185 | 1/1984 | Adrian et al. | 379/377 |
| 4,455,453 | 6/1984 | Parasekvakos et al. | 379/106 |
| 4,469,917 | 9/1984 | Shelley | 379/107 |
| 4,477,698 | 10/1984 | Szlam et al. | 379/377 |
| 4,486,625 | 12/1984 | Reinauer et al. | 379/107 |
| 4,521,643 | 6/1985 | Dupuis et al. | 379/92 |
| 4,540,854 | 9/1985 | Beirne | 379/345 |
| 4,578,536 | 3/1986 | Oliver et al. | 379/107 |
| 4,578,700 | 3/1986 | Roberts et al. | 358/84 |
| 4,596,021 | 6/1986 | Carter et al. | 379/98 |
| 4,640,988 | 2/1987 | Robinton | 379/90 |
| 4,660,218 | 4/1987 | Hashimoto | 379/93 |
| 4,674,117 | 6/1987 | Burns | 379/377 |
| 4,742,536 | 5/1988 | Dewenter et al. | 379/97 |
| 4,766,548 | 8/1988 | Cedrone et al. | 379/106 |
| 4,811,389 | 3/1989 | Balch | 379/377 |
| 4,833,618 | 5/1989 | Verma et al. | 379/107 |

FOREIGN PATENT DOCUMENTS 2163624 2/1986 United Kingdom ................ 379/377

Primary Examiner—Jin F. Ng
Assistant Examiner—Wing F. Chan
Attorney, Agent, or Firm—Irell & Manella

[57] ABSTRACT

Apparatus in an automatic telecommunications system which communicates between a central location and at least one remote location over the switched telephone network, senses changes in loading of the telephone line which correspond to a telephone going off-hook, to serve as an indication that a telephone has gone off-hook and to cause the automatic telecommunications system to relinquish its use of the telephone line, or not to go off-hook if a telephone is in use.

5 Claims, 3 Drawing Sheets

METHOD AND APPARATUS FOR DETERMINING WHEN A TELEPHONE HANDSET IS OFF-HOOK

BACKGROUND OF THE INVENTION

This invention pertains to the field of automatic telecommunications devices which operate over telephone lines. More particularly, this invention pertains to the use of automatic telecommunication devices on telephone lines on which normal voice conversations can also occur, and in which the telecommunications device detects when a telephone on the same line is off-hook so that it may release the line and thus ensure that normal usage of the telephone is not affected by the presence of the device.

There are a large number of applications in which it is desirable to install automatic data collection and reporting devices in a remote unattended site. These devices typically report to a central computer system using some form of telecommunications modem. It is generally more desirable to install this equipment on a switched network telephone line rather than a permanently dedicated leased telephone line. Whenever possible, it is economically preferable to use an existing voice telephone line rather than install a special telephone line for the sole use of this equipment.

However, sharing a telephone line between normal subscriber usage and automatic machine usage can create some special problems. In particular, the presence of the automatic equipment should not impact on normal usage of the telephone line for voice communications. Therefore, the equipment must have some means of determining when the telephone line is being used for normal voice communication on one of the local telephones. The equipment must not attempt to use the telephone line if it can determine that the line is in use, and it must make the determination without interfering with existing traffic. When the equipment is using the telephone line, it must abandon the line if one of the local telephones goes off-hook. There is a serious liability issue involved in using the subscriber phone line. The automatic equipment must not prevent normal usage of the telephone in an emergency situation.

Determining when no devices are loading the telephone line is relatively straight forward, and requires making a DC voltage measurement between ring and tip of the telephone line. However, one problem is that the characteristics of the telephone line itself can change greatly, both from site to site and at a single site over a period of time. Moreover, when the automatic device is using the telephone line it must also be able to detect when one of the local telephones goes off hook. This is a far more difficult determination to make since there is a great variation in the line loading created by different types of telephones. In addition, all known prior art off-hook detectors have one or more of the following shortcomings: require earth ground as a voltage reference, do not provide total isolation from the line, respond slowly, malfunction in the presence of noise, generate noise which can interfere with data transmission, require interaction between local and remote locations to function, or are costly and/or bulky.

OBJECTS AND SUMMARY OF THE INVENTION

It is an object of the present invention to provide a system and method for use with an automatic telecommunications system which utilizes the switched telephone network between a central location and at least one remote location and which is capable of sensing when a telephone goes off-hook at the remote location to itself relinquish use of the telephone network, without any of the aforementioned shortcomings of the prior art.

Briefly, in accordance with some embodiments of the invention, there is provided at the remote location apparatus which senses the change in telephone line loading which occurs when a telephone goes off-hook, and utilizes the sensed change in loading to cause the automatic telecommunications system to quickly relinquish control of the telephone line to the telephone.

Other objects and advantages of the present invention will appear from the following detailed description taken in conjunction with the accompanying drawings.

DETAILED DESCRIPTION

Figure 1:
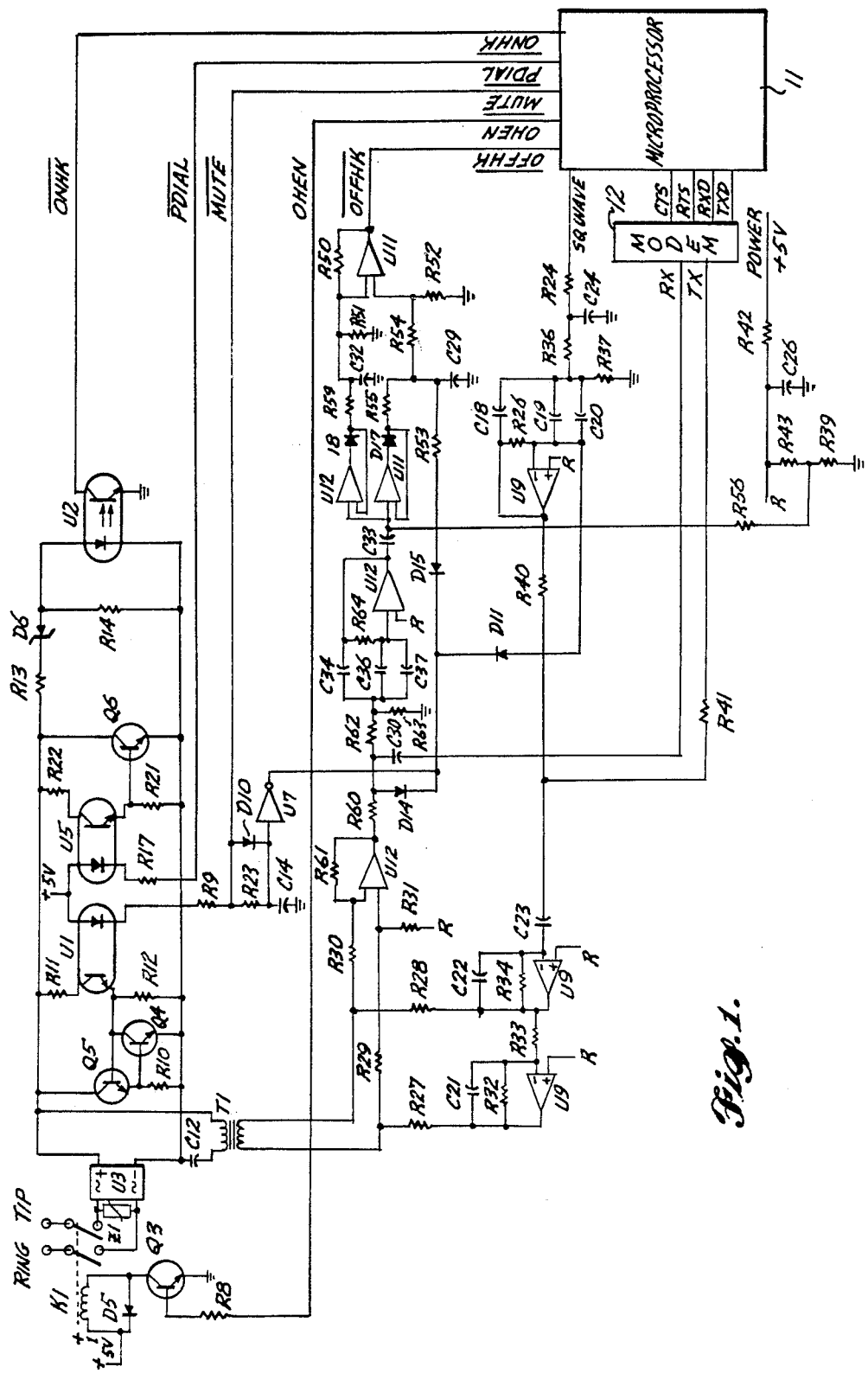
FIG. 1 a circuit diagram of one embodiment of the invention which utilizes a specially generated test signal to sense changes in telephone line loading.

Turning now to a consideration of FIG. 1, there is shown a circuit diagram of one embodiment of the invention. The circuit of this invention is under control of a microprocessor 11, which controls not only the circuit of this invention but also a modem 12. The modem 12 in accordance with this embodiment of the invention is a Bell 202 half duplex modem. The microprocessor 11 and modem 12 are interconnected by the various signal lines shown in FIG. 1.

First of all, before going off-hook, the device and system of FIG. 1 determines whether a handset of the telephone system is off-hook. This is done by the microprocessor 11 actuating the signal line OHEN to close the relay K1. Closing the relay K1 causes the voltage between ring and tip of the telephone line to be presented to circuitry comprising resistor R13, diode D6, and light emitting diode-phototransistor U2. If the line voltage on the telephone line is 30 volts or higher, this circuitry will conduct sufficiently to pull the data line $\overline{\text{ONHK}}$ low through the resistor R25. This indicates that there is no device across the phone line drawing significant DC current, such as an off-hook telephone. This arrangement has galvanic isolation from the telephone line, has not need for an earth-ground voltage-measurement reference, is impervious to large common-mode 60 Hz noise signals and, hence, improves upon the prior art.

If the microprocessor 11 determines that there is no off-hook telephone, then the microprocessor in accordance with its program determines that it is satisfactory for the modem 12 to go off-hook. This is accomplished by the microprocessor 11 actuating the signal line $\overline{\text{MUTE}}$. Actuation of the signal line $\overline{\text{MUTE}}$ turns on the transistor Q5, which establishes the DC loop current. Transistors Q5 and Q6, together with resistor R10, form a constant current sink, with values selected in accordance with a preferred embodiment to set a current of approximately 28 milliamps. This circuitry is switched on by the $\overline{\text{MUTE}}$ signal line via the light emitting diode phototransistor U1, together with resistors R11, R12 and R9. Since this arrangement is a constant current sink, the resulting shunt impedance is high, set mainly by the value of the resistor R11. This allows audio driving and termination elsewhere, in the embodiment of FIG. 1 via a small coupling transformer T1. When the microprocessor 11 has determined that there is no off-hook telephone on the line, it can tone-dial via modem 12 or pulse-dial using MUTE. Since this causes only about 28 milliamperes of loop current which may not be adequate for pulse dialing purposes, PDIAL is simultaneously actuated. This turns on the optoisolator U5 via R17, which saturates Q6 via R22. R21 insures complete Q6 turnoff. When Q6 saturates, the telephone loop is essentially shorted, which constitutes an adequate dialing condition. After dialing, Q6 and PDIAL are not used. Note that during the breaks in dialing the line status can be monitored as before, via R13, D6 and U2.

With the device or system of the present invention off-hook, after determining before and during pulse dialing or before tone dialing that no telephones are off-hook, the important determination becomes that of sensing if and when a telephone goes off-hook. In accordance with this embodiment of the invention, continuing and continuous detection of a telephone going off-hook after using R13, 16 and U2 is provided by detecting a reduction in the amplitude of a transmitted test signal. The test signal in accordance with this embodiment is a 300 Hz square wave, shown for simplicity and convenience in FIG. 1 as being derived from or generated by the microprocessor 11. This 300 Hz test signal is shaped by resistors R24, R36, R37, R26, capacitors C24, C18, C19, C20 and U9, to provide a low distortion 300 Hz sine wave. Low distortion is desirable so that the sine wave does not affect operation of the modem 12, such as its carrier detect function. The 300 Hz sine wave is mixed with the transmitted data signal TX from modem 12. The mixing is performed at resistors R40 and R41, with the values of these resistors chosen such that the outgoing transmitted data TX is at a −10 dBM signal level. This mixed signal is transmitted on the telephone line through the coupling transformer T1 by the push-pull circuit comprised of U9 and related discrete components shown in FIG. 1.

The outgoing signal at transformer T1 is sampled by the circuitry comprising U12 and resistors R29, R30, R31 and R61, which buffers this signal for the tuned amplifier comprising U12, resistors R62-64, and capacitors C34, C36-37. This amplifier is tuned for 300 Hz, and rejects the modem signal band (frequencies higher than 1000 Hz) while providing gain for the 300 Hz test signal. It is presence of anon-interfering test signal during the off-hook state which allows continuous off-hook detection, unilaterally and at low cost, galvanically isolated from the telephone line. This arrangement represents significant improvement upon the prior art.

The filtered 300 Hz test signal is passed via diodes D17 and D18 to two similar peak detecting integrators. The integrator comprising resistor R59, capacitor C32 and resistor R51 has a time constant of approximately 0.5 seconds. The integrator comprising resistor R55, capacitor C29, resistor R54 and resistor R52 has a time constant of approximately 10 seconds. The short term average of the 300 Hz test signal on the telephone line, stored in C32, is compared with the long term average, stored in C29, by the comparator U11 to detect changes in line loading. More specifically, it has been established that a telephone going off-hook across the line causes a reduction in the 300 Hz test signal of greater than 2 dB. This substantial change is detected by the comparator U11 when the faster integrator settles to the lower amplitude, resulting in the $\overline{\text{OFFHK}}$ signal going to the active state.

The long time constant integrator is a self adjusting reference which makes it unnecessary to have setup or trim controls. The typical variations in telephone lines from site to site or at one site over time are compensated for by the long time constant reference level. Resistors R54 and R52 form a divider which insures that the resting level in the long time constant integrator is always less than the other one. Resistors R55, R53, diode D15 and U7 set an idle level for the long time constant integrator which is guaranteed lower than the other under all start up and transient conditions by raising the signal $\overline{\text{MUTE}}$. Resistors R59 and R55 reduce integrator charging due to telephone line transients and normalize the driving source. Resistor R50 adds hysteresis to the comparator, to insure clean output during switching. The ratio of resistors R54 and R52 sets the detection sensitivity, together with the ratio of resistors R50 and R59 which set the amount of hysteresis. Resistors R43 and R39 form an 0.83 volt bias source which insures that both integrators are constantly partly charged to reduce acquisition time as well as to set a bottom limit to integrator discharge and to insure predictable startup and idle conditions. Variations in modem signal level or moderate noise on the telephone line will not affect the off-hook detector.

The signal $\overline{\text{OFFHK}}$ is sampled frequently to detect the off-hook condition of a telephone on the same line by microprocessor 11. Upon detection of $\overline{\text{OFFHK}}$ going active, the microprocessor will vacate the telephone line by disabling the OHEN and $\overline{\text{MUTE}}$ signal lines.

The system and arrangement described in connection with FIG. 1 uses a 300 Hz test signal as a means of determining when a telephone handset goes off-hook, and the 300 Hz test signal is generally out of band for all unconditioned telephone line type modems. This type of arrangement is particularly well suited for half-duplex modems, although it of course works equally well for full-duplex modems.

Figure 2:
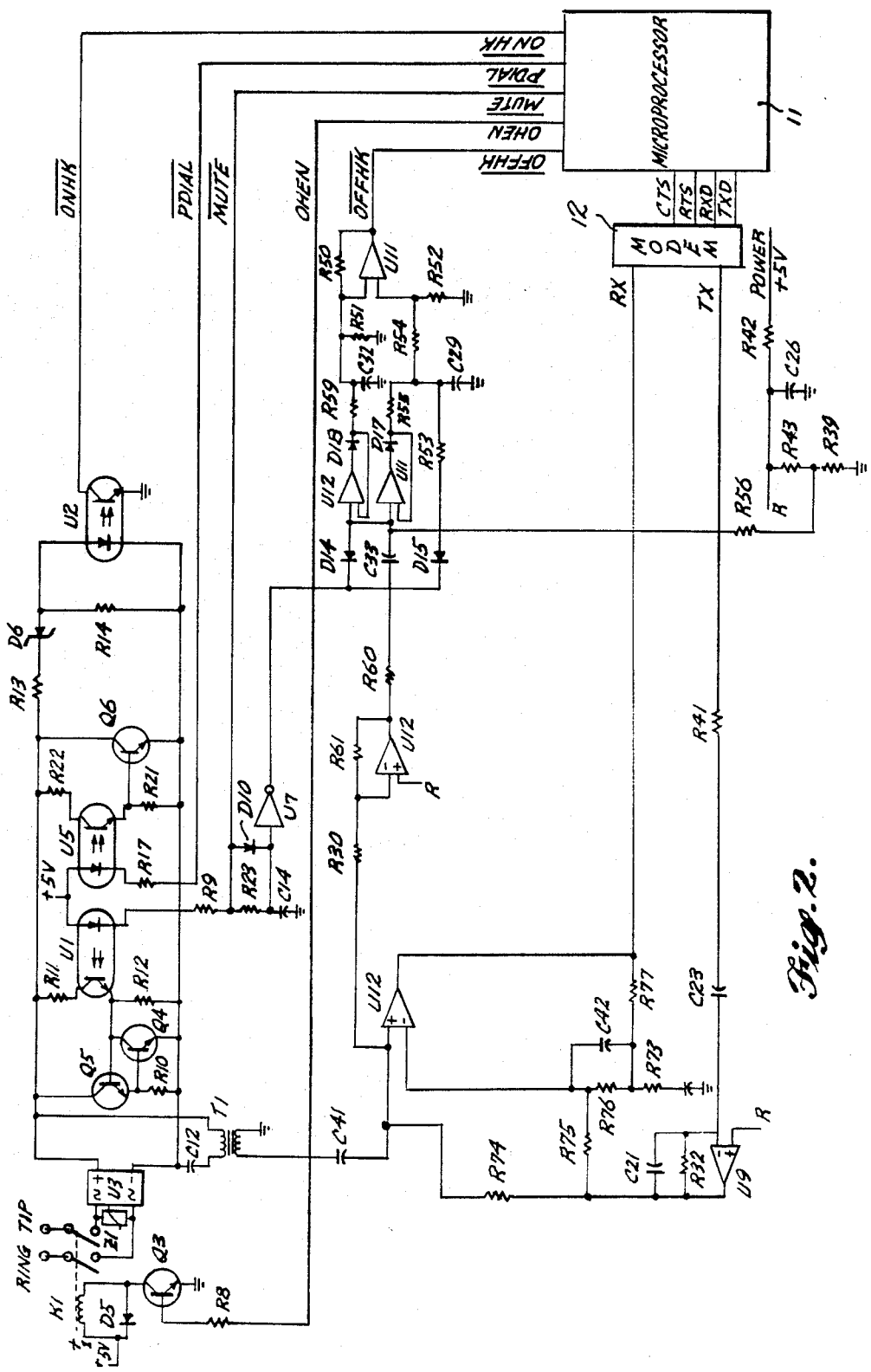
FIG. 2 is a circuit diagram of another embodiment of the invention which utilizes the data signal of the telecommunications signal itself to sense changes in telephone line loading corresponding to a telephone handset going off-hook.

In accordance with another embodiment of the invention, and for the case of full-duplex modems, a simplification can be made in that the 300 Hz test signal is not needed. In a full-duplex modem, such as a Bell 212 type, the transmitted data signal can itself be utilized for detecting an off-hook condition. The arrangement for this is illustrated in FIG. 2, in which like reference numerals have been used as in FIG. 1 to refer to the same components and circuitry arrangements. In the arrangement of FIG. 2 the tuned amplifier for separating the test signal in the arrangement of FIG. 1 has been eliminated, together with the other circuitry for specifically dealing with the 300 Hz test signal. In FIG. 2 the outgoing data signal TX from modem 12 is amplified by the driver circuit comprised of U9 and related discrete components shown in FIG. 2 to the coupling transformer T1. The outgoing signal TX is sampled by the circuitry comprising U12 and related components shown in FIG. 2 and passed via diodes D17 and D18 to two similar peak detecting integrators. The integrator comprising resistor R59, capacitor C32 and resistor R51 has a time constant of approximately 0.5 seconds, as was the case in the arrangement of FIG. 1. Similarly, the other integrator comprising resistor R55, capacitor C29, resistor R54 and resistor R52 has a time constant of approximately 10 seconds. Like the system of FIG. 1, the system of FIG. 2 in the case of a full duplex modem functions such that it is self adjusting for variations in telephone lines, so that it is not necessary to have any trim controls or setup controls. Any step change in the outgoing data signal as would result when a telephone across tip and ring went off-hook, is detected by the comparator U11 when the faster integrator settles to the lower amplitude, resulting in the $\overline{\text{OFFHK}}$ signal supplied to microprocessor 11 going to the active state. Upon detection of OFFHK going active, the microprocessor will vacate the telephone line by disabling OHEN and MUTE.

Figure 3:
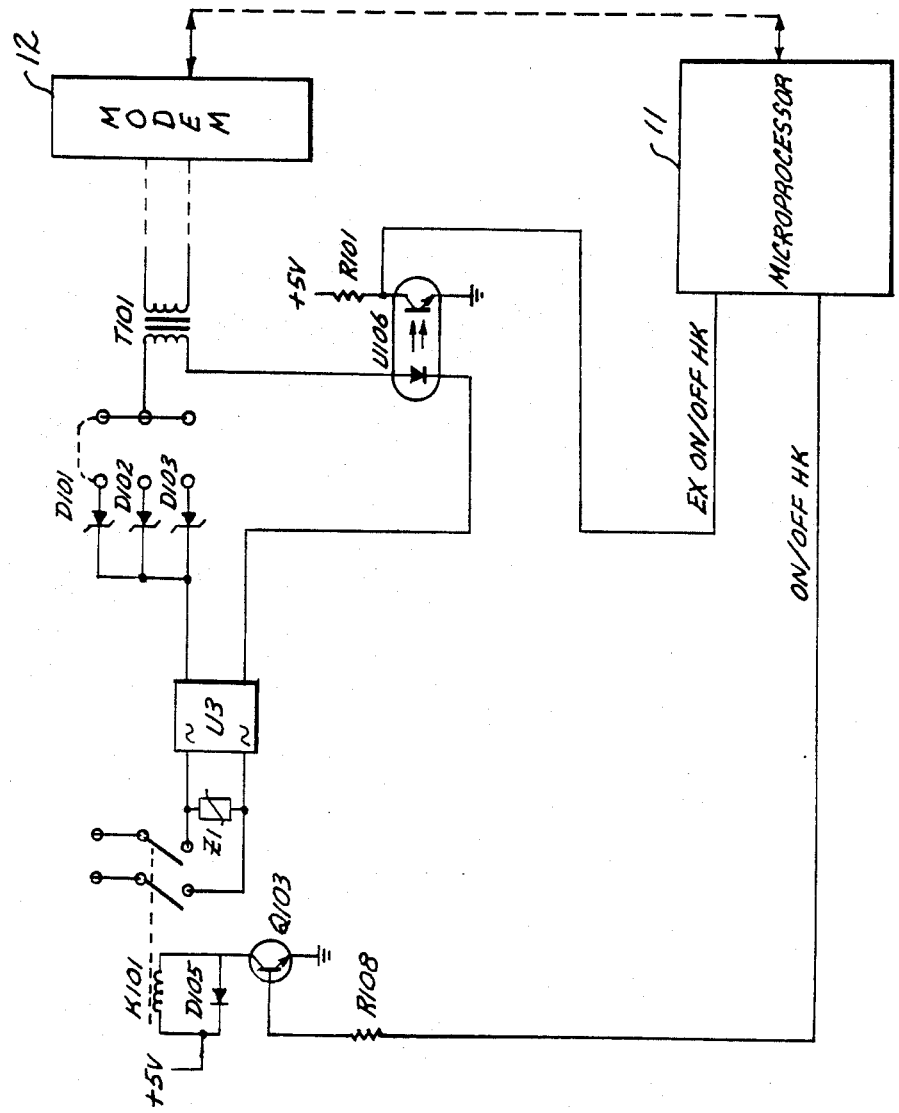
FIG. 3 is a circuit diagram of still another embodiment of the invention for sensing reduction of telephone line loading corresponding to a telephone handset going off-hook.

Turning now to a consideration of FIG. 3, there is shown an even more simplified arrangement for an off-hook detector in accordance with still another embodiment of the invention. In FIG. 3 the various coupling circuitry interconnecting a modem 12 with a microprocessor 11 is, for simplicity, not shown, nor is the various circuitry coupling the output of the modem 12 to the coupling transformer T101 shown in FIG. 3. Suitable circuitry for such coupling arrangements has been shown in connection with FIGS. 1 and 2 and is, moreover, known to those skilled in the art.

In normal operation of telephone lines, when a telephone goes off-hook, the approximately 48 volts put on the telephone line drops typically to around 7 to 10 volts. The word typically is used inasmuch as telephone lines vary in characteristics in accordance with their distance from a telephone company central office and the amount of loading a particular brand or model of telephone has when it is taken off-hook. Telephone line impedances can vary anywhere from 440 to 3600 Ohms. In accordance with the embodiment of the invention illustrated in FIG. 3, a Zener diode D101 is provided, which will maintain the line voltage across tip and ring at approximately 17 volts DC. In the arrangement of FIG. 3, a current loop is established from tip through Zener diode D101, through transformer T101, through a light emitting diode-phototransistor U106, and back to ring once the relay K101 has been pulled to go off-hook via the ON/OFF HK control line through resistor R108 and transistor Q103 from microprocessor 11. The output from U106 taken at resistor R101 is coupled to the microprocessor 11. When the Zener diode D101 is conducting, which corresponds to the situation when no telephone extensions are off-hook, the above-described current loop is established and the signal from U106 to the microprocessor is that no telephone extensions are off-hook. However, if a telephone extension goes off-hook, then the telephone line voltage is insufficient for Zener diode D101 to conduct, and no current loop is established. This information is coupled to the microprocessor 11 via the EX ON/OFF HK signal line, and the microprocessor acts on the information to either not have the modem go off-hook, or to have it go back on-hook if it was off-hook.

In FIG. 3 the Zener diode D101 is shown as being connected by a jumper (dotted lines) with the transformer T101. In accordance with a specific embodiment the Zener diode D102 is a 1N5353A diode that establishes a voltage of approximately 17 volts. The other Zener diodes D102 and D103 shown in FIG. 3 are lower voltage Zener diodes which can be selected for use in cases where a telephone line is extremely far from a central office and the voltage on the line is low to begin with. In that case, the jumper indicated by the dotted lines in FIG. 3 is simply connected to the appropriate one of the diodes.

It should be clear that various modifications to the specific embodiments of the invention disclosed herein are possible and will occur to those skilled in this art, but that those modifications are clearly within the scope of the present invention. It is intended in the appended claims to define the scope to which the present invention is entitled.

We claim:

1. In an automatic telecommunication system including a central location and at least one remote location and wherein a data reporting system including a modem is situated at the remote location for establishing data communications with the central location over the switched telephone network, the improvement comprising means for determining prior to initiating communications with the central location whether a telephone at the remote location is off-hook and for inhibiting communications with the central location if a telephone is off-hook, and further comprising means for determining during the time that communications are established with the central location whether a telephone at the remote location goes off-hook comprises means for generating a test signal and applying the test signal between ring and tip of a telephone line, first and second integrator means having respectively short and relatively long integration time constants for integrating the test signal, comparison means for comparing the integrated signal outputs of said first and second integrators, whereby a substantial difference between the integrated signal outputs of said first and second integrators is indicative that an additional load has been placed between tip and ring of the telephone line, corresponding to a telephone going off-hook.

2. In an automatic telecommunication system including a central location and at least one remote location and wherein a data reporting system including a modem is situated at the remote location for establishing data communications with the central location over the switched telephone network, the improvement comprising means for determining prior to initiating communications with the central location whether a telephone at the remote location is off-hook and for inhibiting communications with the central location if a telephone is off-hook, and further comprising means for determining during the time that communications are establishing with the central location whether a telephone at the remote location goes off-hook comprises first and second integrator means having respectively short and relatively long integration time constants for integrating the data communications signal being transmitted by the modem to the central location, comparison means for comparing the integrated signal outputs of said first and second integrators, whereby a substantial difference between the integrated signal outputs of said first and second integrators is indicative that an additional load has been placed between tip and ring of the telephone line, corresponding to a telephone going off-hook.

3. A method of operating an automatic telecommunication system including a central location and at least one remote location and wherein a data reporting system including a modem is situated at the remote location for establishing data communications with the central location over the switched telephone network, comprising the steps of determining prior to initiating communication with the central location whether a telephone at the remote location is off-hook and inhibiting communications with the central location is a telephone is off-hook, and further comprising the step of determining during the time that communications are established with the central location whether a telephone at the remote location goes off-hook includes generating a test signal and applying the test signal between ring and tip of a telephone line, providing the first and second integrator means having respectively short and relatively long integration time constants for integrating the test signal, comparing the integrated signal outputs of said first and second integrators, whereby a substantial difference between the integrated signal outputs of said first and second integrators is indicative that an additional load has been placed between tip and ring of the telephone line, corresponding to a telephone going off hook.

4. A method of operating an automatic telecommunication system including a central location and at least one remote location and wherein a data reporting system including a modem is situated at the remote location for establishing data communications with the central location over the switched telephone network, comprising the steps of determining prior to initiating communication with the central location whether a telephone at the remote location is off-hook and inhibiting communications with the central location if a telephone is off-hook, and further comprising the step of determining during the time that communications re established with the central location whether a telephone at the remote location goes off-hook includes providing first and second integrator means having respectively short and relatively long integration time constants for integrating the data communications signal being transmitted by the modem to the central location, and comparing the integrated signal outputs of said first and second integrators, whereby a substantial difference between the integrated signal outputs of said first and second integrators is indicative that an additional load has been placed between tip and ring of the telephone line, corresponding to a telephone going off-hook.

5. Apparatus in accordance with claim 1 or 3, wherein said test signal is a predetermined low frequency signal and different from the frequency of the modem signal in frequency.

* * * * *